United States Patent [19]

Suzaki et al.

[11] Patent Number: 4,835,519
[45] Date of Patent: May 30, 1989

[54] DETECTING APPARATUS USING ULTRASONIC WAVES

[75] Inventors: Hideyuki Suzaki, Ootsu; Yukio Yamaguchi, Nagaokakyo, both of Japan

[73] Assignee: Omron Tateisi Electronics Co., Kyoto, Japan

[21] Appl. No.: 63,402

[22] Filed: Jun. 18, 1987

[30] Foreign Application Priority Data

Jun. 18, 1986 [JP] Japan .................. 61-143750

[51] Int. Cl.⁴ .............................. G08B 1/08
[52] U.S. Cl. ........................ 340/538; 73/632
[58] Field of Search ........... 340/538, 533, 531, 524; 73/632, 629, 579; 367/107, 903, 902, 908

[56] References Cited

U.S. PATENT DOCUMENTS

| | | | |
|---|---|---|---|
| 4,222,113 | 9/1980 | Hansen | 367/903 |
| 4,360,905 | 11/1982 | Hackett | 367/94 |
| 4,523,472 | 6/1985 | Blades | 73/632 |
| 4,581,726 | 4/1986 | Makino et al. | 367/902 |
| 4,700,569 | 10/1987 | Michalski et al. | 367/908 |

FOREIGN PATENT DOCUMENTS 5876781 5/1983 Japan .
5883286 5/1983 Japan .

OTHER PUBLICATIONS

Patent Abstracts of Japan, vol. 7 No. 180 (P-215) [1325], 9 Aug. 1983.
Patent Abstracts of Japan, vol. 7, No. 168 (P-212) [1313], 23 Jul. 1983.
European Search Report for Application Number EP 87 10 8674.

*Primary Examiner*—Stewart J. Levy
*Assistant Examiner*—Louis M. Arana

[57] ABSTRACT

A detecting apparatus using ultrasonic waves comprises a sensor unit and a signal processing unit for processing a reception signal sent from the sensor unit to output a detection signal. These units are connected by a cable having three core wires. A power supply signal, an ultrasonic transmission signal and operation indication signal are multiplexed to the first core wire and transmitted from the signal processing unit to the sensor unit. An ultrasonic reception signal and a temperature detection signal are multiplexed to the second core wire and transmitted from the sensor unit to the signal processing unit. The third core wire is used to connect the grounding levels of both units.

11 Claims, 4 Drawing Sheets

DETECTING APPARATUS USING ULTRASONIC WAVES

BACKGROUND OF THE INVENTION

The present invention relates to what is called an ultrasonic switching apparatus for detecting the presence or absence of an object, a distance to the object, the presence or absence of an object in a predetermined range, or the like by use of ultrasonic waves and, more particularly, to an ultrasonic switching apparatus of what is called the amplifier separate type in which an ultrasonic sensor unit and a signal processing unit (also called an amplifier unit) are separated and these units are connected by a cable.

An apparatus to detect an object using ultrasonic waves is generally an apparatus of the reflection type. Namely, pulse-like ultrasonic waves are transmitted and the reflected waves returned by being collided with an object to be detected are received. In principle, when the reflected waves are received, a detection signal of the object is output. When the level of the reflected waves is detected and it is above a predetermined level, the object detection signal is output. There is also an apparatus which determines that an object could be detected only when the reflected waves were received within a constant period of time after the pulse-like ultrasonic waves had been transmitted. In particular, the latter apparatus is used to detect an object which is located within a range of a predetermined distance from the position of the ultrasonic sensor. By measuring the time until the reflected waves are received after the ultrasonic waves had been transmitted, the distance from the position of the ultrasonic sensor to an object can be also measured. The ultrasonic waves are propagated in the air at the sound velocity and the sound velocity changes depending on the temperature. Therefore, in the case of considering a factor of the distance (which is obtained by multiplying the sound velocity with the time) in the detecting or measuring process, the temperature correction needs to be performed, so that it is inevitable to measure the temperature.

In an ultrasonic detecting apparatus of the type such that an ultrasonic sensor unit and a signal processing unit are separated, both units are connected by a cable (lines). This cable needs total six core wires (or cores, lines or conductors) consisting of five core wires to transmit at least the following signals and a OV line to made the grounding levels of both units coincident.

The following signals are transmitted from the signal processing unit to the ultrasonic sensor unit:

(1) a pulse-like transmission voltage signal to pulse-drive an ultrasonic transducer of the ultrasonic sensor unit;

(2) a power supply signal to make each circuit, element, and the like of the sensor unit operative; and (3) an operation indicating signal to indicate the detection of an object by lighting up an operation indicator provided for the sensor unit.

The following signals are transmitted from the sensor unit to the signal processing unit:

(1) a reception signal which is generated when the reflected waves from the object to be detected were received; and (2) a temperature detection signal which is output from a temperature sensor provided for the sensor unit and is used to perform the sound velocity correction.

Since the cable having many core wires is necessary as described above, there are problems such that the cost increases by an amount as much as the number of core wires and at the same time, the working efficiency deteriorates in the field where the ultrasonic detecting apparatus is attached.

SUMMARY OF THE INVENTION

It is an object of the present invention to reduce the number of core wires in a cable connecting the ultrasonic sensor unit and the signal processing unit as small as possible.

A detecting apparatus using ultrasonic waves according to the present invention comprises: a sensor unit including an ultrasonic transducer, an operation indicator and a temperature sensor; and a signal processing unit for processing a reception signal sent from the sensor unit to feed a detection signal. These units are connected by a cable having at least two core wires. The first core wire between two core wires is used to transmit a signal from the signal processing unit to the sensor unit. This signal is transmitted by being multiplexed with a power supply signal for the sensor unit, an ultrasonic wave transmission signal and an operation indication signal for the operation indicator. The second core wire is used to transmit a signal from the sensor unit to the signal processing unit. This signal is transmitted by being multiplexed with a reception signal obtained from the ultrasonic transducer and a temperature detection signal derived from the temperature sensor.

Preferably, a third core wire is provided in the cable and is used to make the grounding levels of both units coincident.

The signal processing unit comprises: a power supply circuit to generate the power supply signal; means for generating the operation indication signal when the detection signal is output; and means for generating the ultrasonic wave transmission signal, wherein these signals are multiplexed and sent to the first core wire. It is preferable that the power supply signal and operation indication signal are set to the DC signal having different voltage levels and these voltage levels are switched, thereby transmitting these signals to the first core wire.

The signal processing unit further has means for separating the reception signal and temperature detection signal which are input through the second core wire. The temperature detection signal is used to correct the propagating speed of the ultrasonic waves when the reception signal is processed.

The ultrasonic sensor unit comprises: a power supply circuit to supply to the circuits of the sensor unit an operating voltage lower than the voltage of the power supply signal which is fed through the first core wire; means for driving the ultrasonic transducer by the transmission signal which is input through the first core wire; and means for separating the operation indication signal sent through the first core wire from the power supply signal and ultrasonic wave transmission signal and for driving the operation indicator.

As described above, since a plurality of signals are multiplexed and transmitted by one core wire, the number of core wires of the cable connecting the sensor unit with the signal processing unit can be reduced. The cost can be reduced by an amount as much as the reduced number of core wires. On the other hand, the working efficiency in the attaching field of the ultrasonic detecting apparatus is improved. An accident such as an erroneous wiring or the like due to a large number of core wires can be prevented.

DETAILED DESCRIPTION OF A PREFERRED EMBODIMENT

Figure 1:
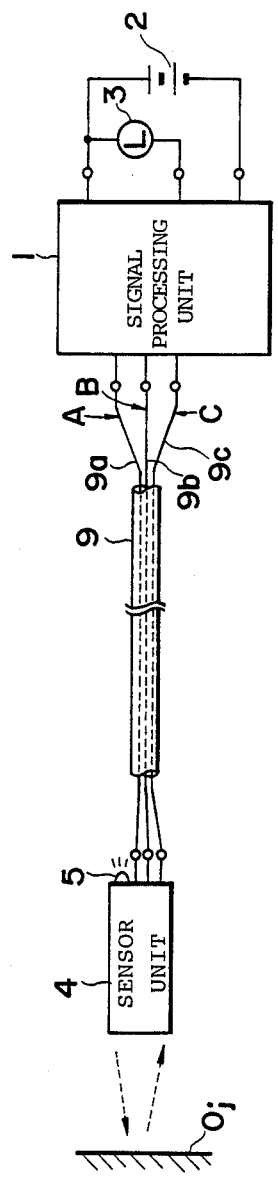
FIG. 1 shows an outline of a whole constitution of an ultrasonic detecting apparatus.

FIG. 1 shows an outline of a whole constitution of an ultrasonic detecting apparatus in which an ultrasonic sonsor unit and a signal processing unit are disposed at remote positions and both units are connected by a cable. A DC power source (E.G., 12V) 2 is connected to a signal processing unit 1 in order to supply an operating electric power to the unit 1. A load 3 such as, for example, an output circuit of a detection signal, an apparatus which operates by the detection signal and the like are connected to the output side of the unit 1. A sensor unit 4 transmits pulse-like ultrasonic waves and receives the reflected waves from an object $O_j$ to be detected and outputs the reception signal. It is discriminated in the signal processing unit 1 whether or not the object has been detected. An operation indicator 5 is attached to the sensor unit 4 in order to indicate the detection of the object on the side of the sensor unit 4. For example, the indicator 5 consists of a light emitting diode (LED).

Figure 2:
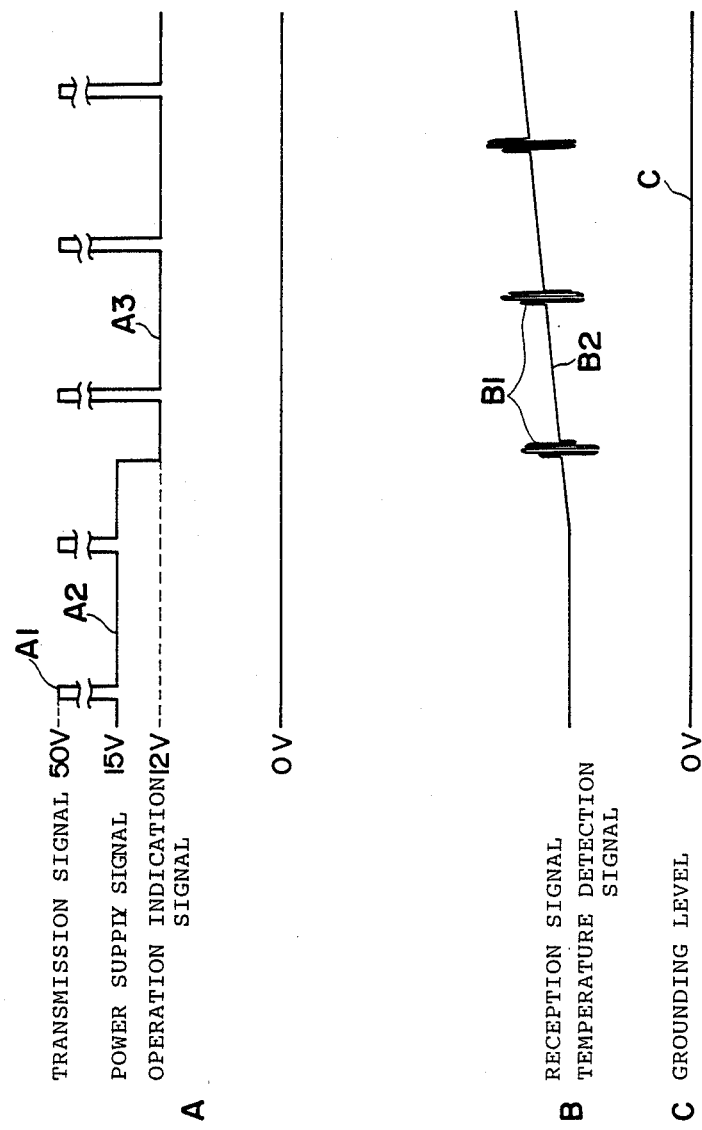
FIG. 2 is a waveform diagram showing signals which are transmitted by a cable.

The signal processing unit 1 is connected with the sensor unit 4 by a cable 9. The cable 9 consists of three core wires 9a, 9b, and 9c. FIG. 2 shows signals which are transmitted by the core wires 9a to 9c.

A signal A which is sent from the signal processing unit 1 to the sensor unit 4 is transmitted by the core wire 9a. The signal A is constituted by multiplexing an ultrasonic wave transmission signal A1, a signal A2 to supply the operating power source of the sensor unit 4 and an operation indication signal A3 to light up the indicator 5. The signal A1 is the pulse voltage signal having a peak value of 50V. This pulse signal has a constant period (this is called an ultrasonic wave transmission period). A check is made to see if the reflected waves from the object $O_j$ have been received for the transmission period or not. Both of the power supply signal A2 and operation indication signal A3 are the DC voltage signals and have the values of 15V and 12V, respectively. As will be understood from FIG. 2, when the object $O_j$ is not detected, the power supply signal A2 of 15V appears as a DC signal in the signal A. However, when the object is detected, the DC signal in the signal A is set to the voltage of 12V of the operation indication signal A3. Such a situation is also incorporated in the concept of multiplex of the signals.

A signal B is sent from the sensor unit 4 to the signal processing unit 1 is transmitted by the core wire 9b. The signal B is constituted by multiplexing a reception signal B1 of the reflected ultrasonic waves and a temperature detection signal B2 which is output from a temperature sensor (a thermistor 7 in FIG. 4, which will be explained hereinafter included in the sensor unit 4.

The core wire 9c is used to make the grounding levels (0V) of both units 1 and 4 coincident. The signal of the grounding level is indicated at C in the diagram.

Figure 3:
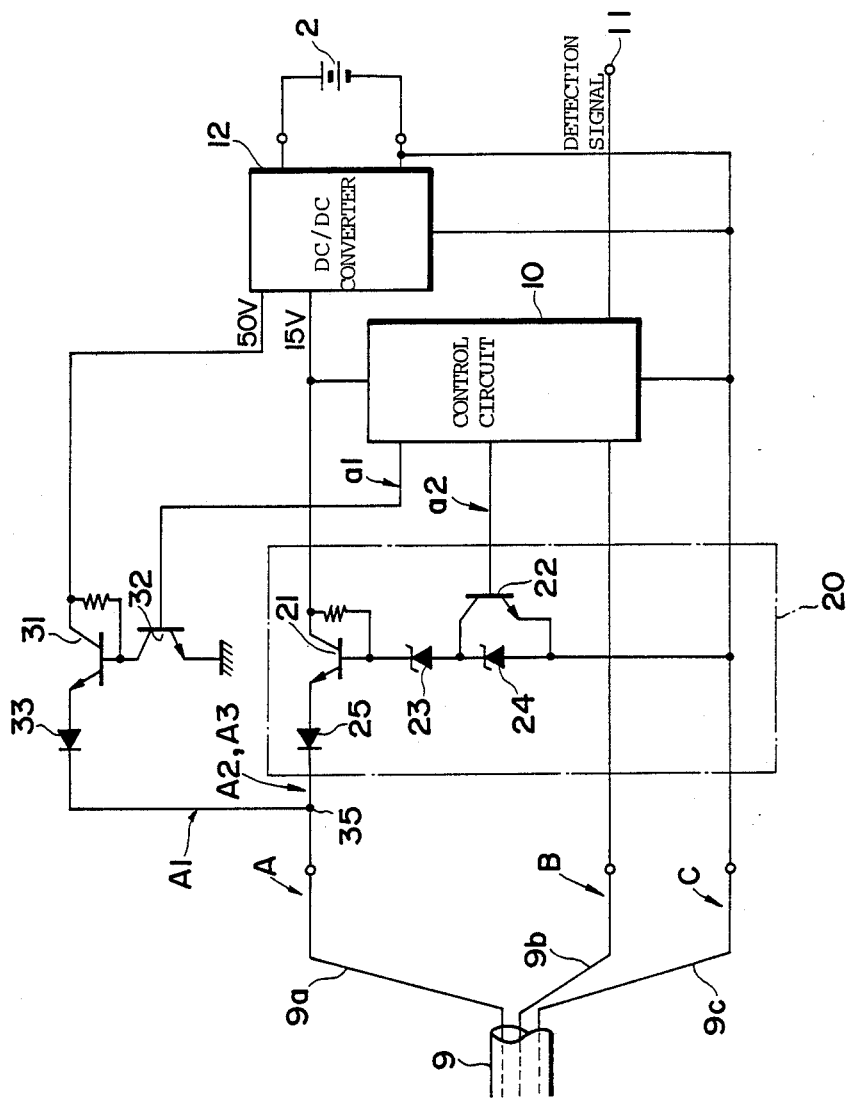
FIG. 3 is a circuit diagram showing a constitution of a signal processing unit.

FIG. 3 shows a circuit constitution of the signal processing unit 1. A control circuit 10 included in the unit 1 controls the output of the transmission signal A1, controls the switching operation between the power supply signal A2 and operation indication signal A3, and detects an object on the basis of the input signal B.

The output voltage of 12V of the DC power source 2 is converted into two kinds of DC voltage signals of 50V and 15V by a DC/DC converter 12. The voltage signal of 50V is applied to a transistor 31. Only when the transistor 31 is turned on (is made conductive), this voltage signal is supplied to a node 35 through a diode 33. The switching operation of the transistor 31 is controlled by a transistor 32. The transistor 32 is controlled by a pulse-like transmission control signal a1 of the L level having the transmission period which is output from the control circuit 10. When the control signal a1 is at the L level, the transistor 32 is turned off (is made non-conductive) and the transistor 31 is turned on. Thus, the transmission signal A1 of the transmission period is obtained at the peak value of 50V. The diode 33 is provided to block a reverse current by the signal A2 or A3 which is supplied to the node 35.

A signal switching circuit 20 also serving as a voltage regulator comprises: a switching transistor 21 connected to an output terminal of the voltage signal of 15V of the DC/DC converter 12; two Zener diodes 23 and 24 which are serially connected to the base of the transistor 21; a transistor 22 connected across the Zener diode 24; and a diode 25 connected to the output side of the transistor 21.

The Zener breakdown voltage of the Zener diode 23 is set to 12V. The Zener breakdown voltage of the Zener diode 24 is set to 3V. When the transistor 22 is turned off, the synthesized breakdown voltage of two Zener diodes 23 and 24 is set to 15V. Therefore, in this case, the circuit 20 functions as a switching regulator 15V. The power supply signal A2 of 15V is sent to the node 35 through the diode 25. The diode 25 is provided to prevent that a reverse current by the pulse signal A1 of a high voltage flows into the transistor 21.

When the control circuit 10 decides that the object has been detected on the basis of the input signal B, the control circuit 10 inverts a switching signal a2 from the L level to the H level. Thus, the transistor 22 is turned on and both ends of the Zener diode 24 are short-circuited. Thus, the base voltage of the transistor 21 is held to 12V by only the Zener diode 23, so that the circuit 20 functions as a voltage regulator of 12V. Accordingly, the operation indication signal A3 of 12V is given to the node 35.

The transmission signal A1 and the power supply signal A2 or operation indication signal A3 which is given from the circuit 20 are superposed at the node 35 and the multiplexed signal is sent as a signal A to the core wire 9a of the cable 9.

The output voltage of 15V of the DC/DC converter 12 is also used as the operating power source of the control circuit 10.

The object detecting process by the control circuit 10 is executed in the following manner. As mentioned above, the reception signal B1 (when the reflected waves were received) and the temperature detection signal B2 are included in the signal B transmitted through the core wire 9b of the cable 9. The reception signal B1 has the ultrasonic frequency. The temperature detection signal B2 very slowly changes. Therefore, there signals are separated using a filter circuit or the like.

If the reception signal B is detected for the period of time after the transmission signal A1 was output until the next transmission signal is output, it is determined in principle that the object has been detected. The detection signal is given to an output terminal 11 and at the same time, the switching signal a2 is set to the H level as mentioned above. When the reception signal B1 was continuously detected a desired plurality of times, it is also possible to determine that the object has been detected. When the level of the input reception signal B1 is detected and it is above a predetermined level, it is also possible to decide that the object has been detected. Further, it is assumed that the reception signal was detected only when the reception signal B1 was input for a constant time after the transmission signal A1 had been output. In this case, the object $O_j$ within a range of a predetermined distance in front of the sensor unit 4 can be detected. Since the propagating speed of the ultrasonic waves changes in dependence on the temperature, the foregoing constant time is corrected on the basis of the separated temperature detection signal B2. The period of time after the transmission signal A1 was output until the reception signal B1 is detected is measured, thereby enabling the distance from the sensor unit 4 to the object $O_j$ to be measured. In this case, the measured distance is also corrected on the basis of the temperature detection signal B2.

Figure 4:
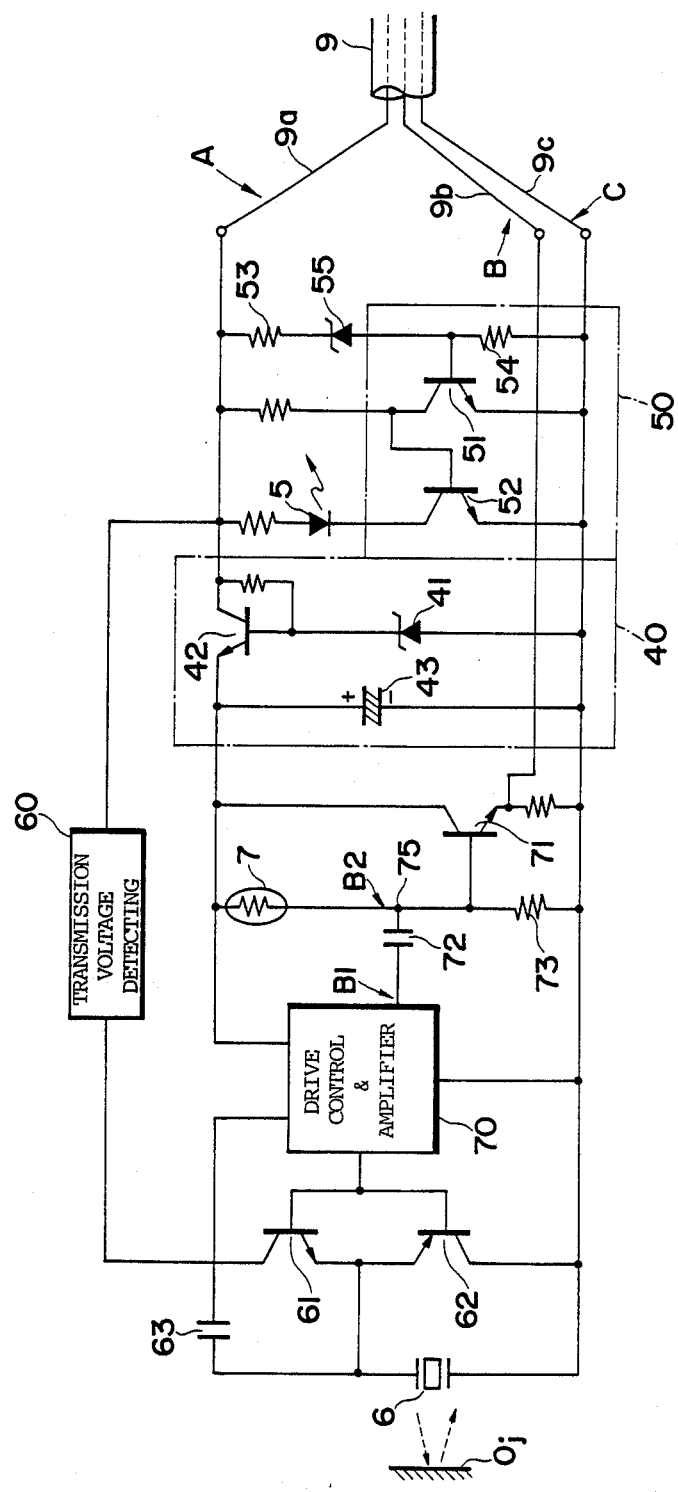
FIG. 4 is a circuit diagram showing a constitution of a sensor unit.

FIG. 4 shows a constitution of the sensor unit 4. The sensor unit 4 has a voltage regulator 40 of 10V. The voltage regulator 40 comprises: a transistor 42 which is supplied with the signal A input through the core wire 9a of the cable 9; a smoothing capacitor 43 arranged on the output side of the transistor 42; and a Zener diode 41 having a Zener breakdown voltage of 10V and connected to the base of the transistor 42. As mentioned above, the pulse signal A1 of 50V and the signal A2 of 15V or signal A3 of 12V are included in the signal A. However, the regulated power source voltage of 10V is realized by the voltage regulator 40 and is supplied to circuits such as a drive control and reception signal amplifier 70 and the like which are connected in the output side of the voltage regulator 40. The level of the signal A varies among 50V, 15V and 12V. However, no problem occurs because the voltage regulator 40 supplies a constant voltage of 10V of the voltage level lower than those voltage levels.

The amplifier 70 functions to oscillate a signal of the ultrasonic frequency and supply to the bases of drive transistors 61 and 62. When the pulse-like transmission signal A1 having the peak value of 50V in the input signal A is detected by a transmission voltage detecting circuit 60, the detecting circuit 60 gives a pulse-like operating voltage to the transistors 61 and 62 synchronously with the pulse signal A1. Therefore, an ultrasonic transducer 6 is driven to generate the pulse-like ultrasonic waves.

When the ultrasonic waves reflected by the object $O_j$ are detected by the ultrasonic transducer 6, a reception signal is fed through a capacitor 63 to the amplifier 70. The amplifier 70, on the other hand, functions to amplify the input reception signal. The amplified reception signal B1 is supplied to a node 75 through a capacitor 72.

The thermistor 7 as the temperature sensor is serially connected with a resistor 73. The output voltage of the voltage regulator 40 is applied to this series circuit. The node 75 is also the node of the thermistor 7 and the resistor 73. Therefore, the potential of the node 75 varies in dependence on a change in resistance value of the thermistor 7 due to a change in temperature. This potential change is taken out as the temperature detection signal B2.

The reception signal B1 and temperature detection signal B2 are multiplexed at the node 75 and amplified by a transistor 71. Thereafter, it is sent as the signal B to the core wire 9b of the cable 9.

Although one ultrasonic transducer 6 functions to transmit and receive the ultrasonic waves in FIG. 4, it is also possible to provide two ultrasonic transducers for transmission and for reception.

The signal A2 of 15V and signal A3 of 12V which are included in the signal A are discriminated by a Zener diode 55. The Zener diode 55 has a Zener breakdown voltage of 14V. On the other hand, the LED 5 as an operation indicator is driven by a drive circuit 5. The drive circuit 50 comprises two transistors 51 and 52.

When the power supply signal A2 of 15V appears in the signal A, the Zener diode 55 is broken down and the proper voltage divided by resistors 53 and 54 is applied to the base of the transistor 51. Thus, the transistor 51 is turned on and the transistor 52 at the post stage is turned off, so that no current flows through the LED 5.

When the DC voltage component of the signal A is set to 12V of the operation indication signal A3, the Zener diode 55 is turned off. In response to the turn-off of the diode 55, the transistor 51 is turned off and the transistor 52 is turned on, so that a current is supplied to the LED 5 to thereby emit the light.

The core wire 9c of the cable 9 is connected to the grounding lines of the circuits of the signal processing unit 1 and sensor unit 4, respectively.

What is claimed is:

1. A detecting apparatus which uses ultrasonic waves, comprising:
    a sensor unit which comprises an ultrasonic transducer, an operation indicator and a temperature sensor; and
    a signal processing unit for processing a reception signal sent from said sensor unit and for outputting a detection signal,
    wherein said sensor unit and said signal processing unit are connected by first and second lines,
    wherein a power supply signal for said sensor unit, an ultrasonic transmission signal and an operation indication signal for said operation indicator are multiplexed to form a first signal which is transmitted on said first line from said signal processing unit to said sensor unit, and wherein
    the reception signal derived from said ultrasonic transducer and a temperature detection signal derived from said temperature sensor are multiplexed to form a second signal which is transmitted on said second line from said sensor unit to said signal processing unit.

2. An ultrasonic detecting apparatus according to claim 1, further comprising a cable having first and second core wires serving as said first and second lines, respectively.

3. An ultrasonic detecting apparatus according to claim 2, wherein a third core wire is included in said cable and said third core wire is used to connect the grounding levels of said sonsor unit and said signal processing unit.

4. An ultrasonic detecting apparatus according to claim 1, wherein said signal processing unit comprises:
   a power supply circuit to generate said power supply signal;
   means for generating said operation indication signal when the detection signal is output; and
   means for generating said ultrasonic transmission signal.

5. An ultrasonic detecting apparatus according to claim 1, wherein said signal processing unit has means for separating the reception signal and said temperature detection signal which are input through said second line.

6. An ultrasonic detecting apparatus according to claim 1, wherein said ultrasonic transducer generates the ultrasonic waves, and wherein when said signal processing unit processes the reception signal, said signal processing unit uses the temperature represented by said temperature detection signal in order to correct for variations in propagating speed of the ultrasonic waves.

7. An ultrasonic detecting apparatus according to claim 1, wherein both said power supply signal and said operation indication signal are DC signals having different voltage levels, and said ultrasonic detecting apparatus further comprises means for selectively transmitting either said power supply signal or said operation indication signal to said first line.

8. An ultrasonic detecting apparatus according to claim 1, wherein said sensor unit has a power supply circuit to supply to circuits of said sensor unit operating voltages lower than the voltage of said power supply signal fed through said first line to said power supply circuit.

9. An ultrasonic detecting apparatus according to claim 8, wherein both of said power supply signal and said operation indication signal are DC signals having different voltage levels, and the level of the output voltage of said power supply circuit is set to be lower than the voltage levels of said power supply signal and of said operation indication signal.

10. An ultrasonic detecting apparatus according to claim 1, wherein said sensor unit has means for driving said ultrasonic transducer by said ultrasonic transmission signal fed through said first line.

11. An ultrasonic detecting apparatus according to claim 1, wherein said sensor unit has means for separating said operation indication signal given through said first line from said power supply signal and said ultrasonic transmission. signal and for driving said operation indicator.

* * * * *